United States Patent [19]

Fudalla et al.

[11] Patent Number: 4,614,285
[45] Date of Patent: Sep. 30, 1986

[54] DEVICE FOR THE DOSED DISPENSING OF LIQUID

[75] Inventors: Manfred Fudalla, Weener/Holthasen; Walter Steiner, Leer/Heisfelde, both of Fed. Rep. of Germany

[73] Assignee: Weener Plastik GmbH & Co. KG, Weener/Ems, Fed. Rep. of Germany

[21] Appl. No.: 630,929

[22] Filed: Jul. 16, 1984

[30] Foreign Application Priority Data

Jul. 20, 1983 [DE] Fed. Rep. of Germany ....... 3326025

[51] Int. Cl.[4] .............................................. G01F 11/26
[52] U.S. Cl. .................................... 222/454; 222/455; 222/543
[58] Field of Search ............................. 222/454–457, 222/584

[56] References Cited

U.S. PATENT DOCUMENTS 1,963,261  6/1934  Cuthbert ............................. 222/584
2,977,028  3/1961  Joffe ................................... 222/454
3,023,937  3/1962  Matter ................................ 222/455

FOREIGN PATENT DOCUMENTS

D3214186  1/1983  Fed. Rep. of Germany .
1064934  5/1954  France ................................ 222/454

Primary Examiner—H. Grant Skaggs
Attorney, Agent, or Firm—Martin A. Farber

[57] ABSTRACT

A device for the dosed dispensing of liquid from a storage container through a delivery tube which comes out of a lower pouring chamber. The dispensing takes place upon the second upside down turning of the container. A cup-shaped housing is divided by a transverse wall into an upper chamber and the lower pouring chamber, the pouring chamber and the upper chamber communicating with each other through a flow hole. The transverse wall is traversed by a feed tube which opens above it. Projecting above this is the delivery tube. An air passage extends through the transverse wall. At least three feed tubes are arranged in symmetrical angular distribution with a respective air passage opening arranged between them.

10 Claims, 6 Drawing Figures

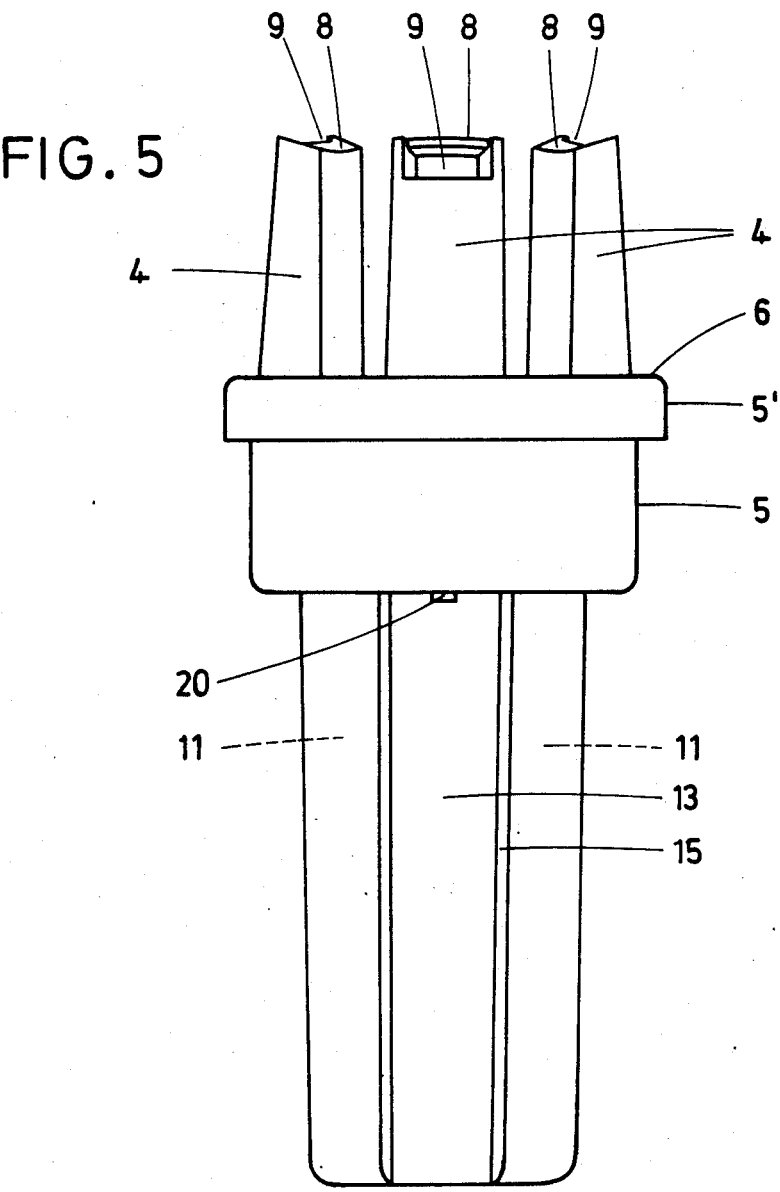

DEVICE FOR THE DOSED DISPENSING OF LIQUID

BACKGROUND OF THE INVENTION

The invention relates to devices for dispensing of liquid in measured quantities. More particularly, the invention relates to a device for the dosed dispensing of liquid from a storage container through a delivery tube which extends out of a lower pouring chamber, the dispensing taking place upon the second turning upside down, a cup-shaped housing being provided which is divided by a transverse wall into an upper chamber and a lower pouring-dosing chamber, the pouring-dosing chamber and the upper chamber being in communication with each other through a flow hole, which transverse wall is traversed by a feed tube which opens above it and above which there is the delivery tube and adjacent which there is an air passage which extends through the transverse wall.

Such a device is known from Federal Republic of Germany OS 32 14 186. In that case, feed tube, delivery tube and air passage lie on a diametral line. The corresponding position determines the direction of tilt for delivery. In the case of storage containers having a specific position for grasping, the corresponding manner of handling is clearly predetermined. Errors in handling may occur, however, in the case, for instance, of storage containers which are of rotational symmetry, unless a clearly apparent marking is provided.

The object of the present invention is to develop a device of this type in a manner which is simple to manufacture and advantageous in use and in such a way that a rapid delivery of the dose is obtained regardless of the tilted position.

SUMMARY OF THE INVENTION

This object is achieved in a device for the dosed dispensing of liquids, the improvement comprising at least three feed tubes (4) arranged in symmetrical angular distribution with a respective air passage opening (18) arranged between them.

As a result of this development there is obtained a device for the dosed delivery of liquids which is simple to manufacture, advantageous in use and substantially independent of any given direction of tilting. Thus no extensive instructions for use or clearly apparent marking is necessary. This result is obtained by means of said at least three feed tubes arranged in symmetrical angular distribution with a respective air passage opening located between said feed tubes. These air passage openings serve for the pressure equalization of the upper chamber and also perform an additional function in that they effect the rapid flowing away of the excess quantity of liquid thereat. The measured dose quantity is in this way accurately obtained. The corresponding plurality of feed tubes also results in a faster filling of the upper chamber, particularly if the air passage openings are provided in a corresponding number. It is furthermore of advantage for the upper chamber to be developed as a flood chamber and the pouring chamber, starting from the delivery tube, is arranged with flow-through clearance in a beaker which extends below the upper chamber and is provided at the height of the transverse wall with a hole which is in communication with an overflow opening in the pouring chamber. The overflow opening determines the level of filling. The hole in the beaker at the same time results in pressure equalization with the inside of the storage container. The flow-through clearance leads to a filling of the pouring chamber, and does so spontaneously as a result of the fact that this clearance is formed by angularly spaced channels of the beaker. In this connection it is advantageous, from a structural standpoint, that the wall sections of the beaker rest between the channels against the wall surface of the pouring chamber. In this case it is further advantageous that the channels and the air passage openings be arranged along the same radii so that an equiangular distribution also results with respect to the channels. Finally, it is also of advantage for the region of the orifice of the delivery tube to form an outward directed collar the bottom side of which comes into anti-turning engagement with the ends of the feed tubes. In this way the proper alignment of the openings of beaker and pouring chamber is dependably brought about.

BRIEF DESCRIPTION OF THE DRAWINGS

The object of the invention will be described in further detail below with reference to an embodiment shown in the drawing, in which:

FIG. 5 shows the cup having the three feed tubes as an insert part, shown by itself.

DETAILED DESCRIPTION OF THE PREFERRED EMBODIMENT

Figure 1:
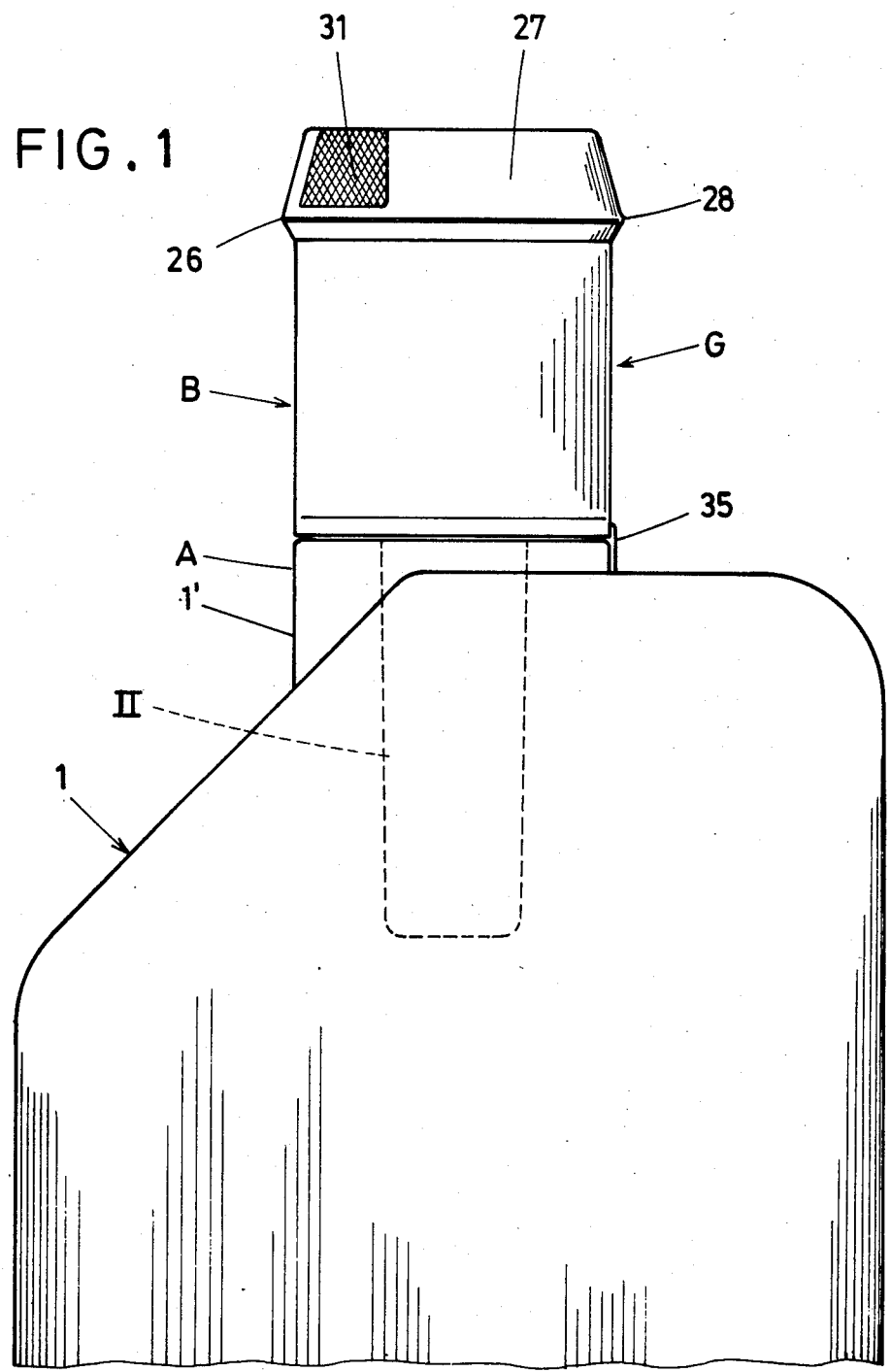
FIG. 1 is a side view of the device connected with the storage container, for instance a bottle neck, shown in approximately actual scale.

The device for the dosed dispensing of liquid 2 which is adapted to be placed on the neck 1' of a storage container 1 consists of a bipartite housing G which is divided by a central transverse wall 3 into an upper chamber I and a pouring chamber II located below it.

The upper chamber I is in communication with the inside 1" of the storage container and therefore with the liquid 2 via three feed tubes 4 arranged in symmetrical angular distribution around the longitudinal central axis y—y of the device. The feed tubes 4 extend from the transverse wall 3 and are directed upward, i.e. in the direction of dispensing. They are rooted in the cup-forming annular wall 5 of the one part A of the housing which is developed as an insert. The rim 6 of the cup is bent over to form an insertion groove 7 and extends in sealing manner over the stepped-down end region 1'''' of the neck 1'. The downward extending flange section of the collar which is parallel to the annular wall 5 bears the reference number 5'. The feed tubes 4 extend above the rim edge 6 of the cup by an amount equal to the depth of the cup. The flow cross section of the feed tubes 4 tapers down towards their free end. An inwardly downwardly inclined roof 8 extends over the top of the feed tubes. Below the roof, a radially outwardly directed window-like outlet opening 9 is present.

Figure 6:
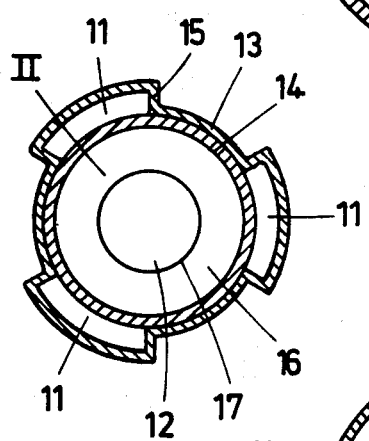
FIG. 6 is a section along the line VI—VI of FIG. 2.

On the storage-container side, the transverse wall 3 which forms the bottom of the cup passes into a cylindrical or slightly conical beaker 10 of reduced cross section. Its height corresponds approximately to 2½ times the depth of the cup. The beaker is in one-piece with the part A. It surrounds the pouring chamber II with flow clearance x. The flow clearance x is formed by three angularly spaced channels 11 which extend in the longitudinal direction of the beaker and come together in the region of the bottom 12 of the beaker. The channels 11 are formed by a circumferential meander-like bending of the beaker wall (see FIG. 6). The beaker's wall sections 13 between the channels 11 rest against the outer surface 14 in the pouring chamber II. The latter is of cylindrical development. The channel narrow walls 15 are directed perpendicular to the longitudinal central axis y—y of the device G.

The bottom 16 of the pouring chamber II has a central flow hole 17. The bottom 16 is located at a distance above the bottom 12 of the beaker 10 which is equal to approximately the flow clearance or radial width (x) of the channels 11.

Between the feed tubes 4, the transverse wall 3 has air passage openings 18, also arranged in the same angular distribution. The pressure equalization for the upper chamber I takes place via them. Furthermore, the three air passage openings serve as flow-out openings for the excess liquid. The channels 11 and air passage openings 18 are arranged on a common radius R. The structure forming the channels and openings widens in the direction of opening of the delivery tube 19.

Approximately at the height of the transverse wall 3 the beaker 10 has a window-like hole 20. This hole is in communication with an overflow opening 21 of the pouring chamber II. That opening determines the height of filling Sp in the pouring chamber II.

The hole 20 is arranged somewhat lower than the overflow opening 21. The edge 21' of the overflow opening on the storage-container side lies approximately at the center of the hole and is aligned with the end of the feed tube 4 present there which terminates at the same height as the edge 21 of the overflow opening.

Figure 4:
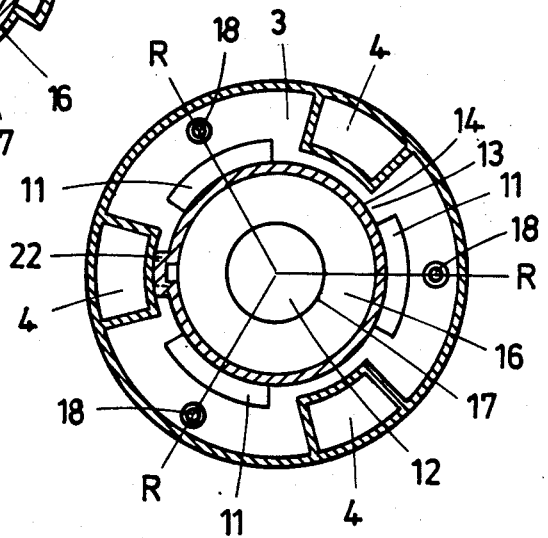
FIG. 4 is a section along the line IV—IV of FIG. 2.

In the region of the overflow opening 21, a nose 22 is formed on the part B which forms the delivery tube 19 (see FIG. 4). This nose comes against the back of the feed tube 4 present there. This back is developed as part of a circular ring. The narrow walls 15 of the approximately square feed tubes 4 extend perpendicular to the longitudinal central axis y—y.

In order to assure the alignment of hole 20 with overflow opening 21, projections 24 extend from the bottom of an outwardly directed collar 23 of the part B forming the delivery tube 19 in order to assure turn-proof engagement into the free spaces between the ends of the overflow tubes 4. These projections are an interrupted, vertically directed annular wall whose vertical front ends 24' end directly in front of the narrow walls of the feed tubes 4.

The collar 23 forms a funnel-shaped pouring spout 25 which passes at one side into a sharp peripheral lip 26. The latter extends somewhat beyond the cylindrical outer wall of the cap-shaped part B.

A hinged cover 27 is simultaneously developed on the part B. It is connected to it by a film hinge 28. An annular plug 29 which closes off the mouth of the delivery tube 19 extends from the underside of the top of the hinged cover 27. This annular stopper engages by means of an annular bead 30 into a groove of corresponding shape on the inner wall of the delivery tube 19. In order to facilitate the grasping of the hinged cover, which is basically of frustoconical shape, two recesses 31 lying perpendicular to the hinge plane of the cover are provided. They lie at a place which is as far as possible from the film hinge 28. The actual gripping surface is provided with a roughening.

On its inner end region the part B bears an annular rib 32. The latter cooperates with a detent rib 33 on the neck 1' of the container.

Part A and part B are also held together by detent means in the manner that directly below the section downward flange 5' of the collar of the part A a detent rib 34 is provided on the inner wall of the part B. This detent rib is moved over by the bent-over rim 6 of the cup until, finally, the front end on the container side lies behind the detent rib 34 lying in the pouring direction.

An anti-turning arrangement turning lock can also be provided between the device G and the container 1. In the embodiment shown, this is obtained by a projection 35 which is developed on the container and engages in a niche 36 of corresponding shape in the device.

In the corresponding engaged position the collar 23 lies on the correspondingly obliquely directed roofs 8 of the feed tubes. As a result of the same angular distribution a sort of stabilized three-point support is thereby obtained.

Figure 2:
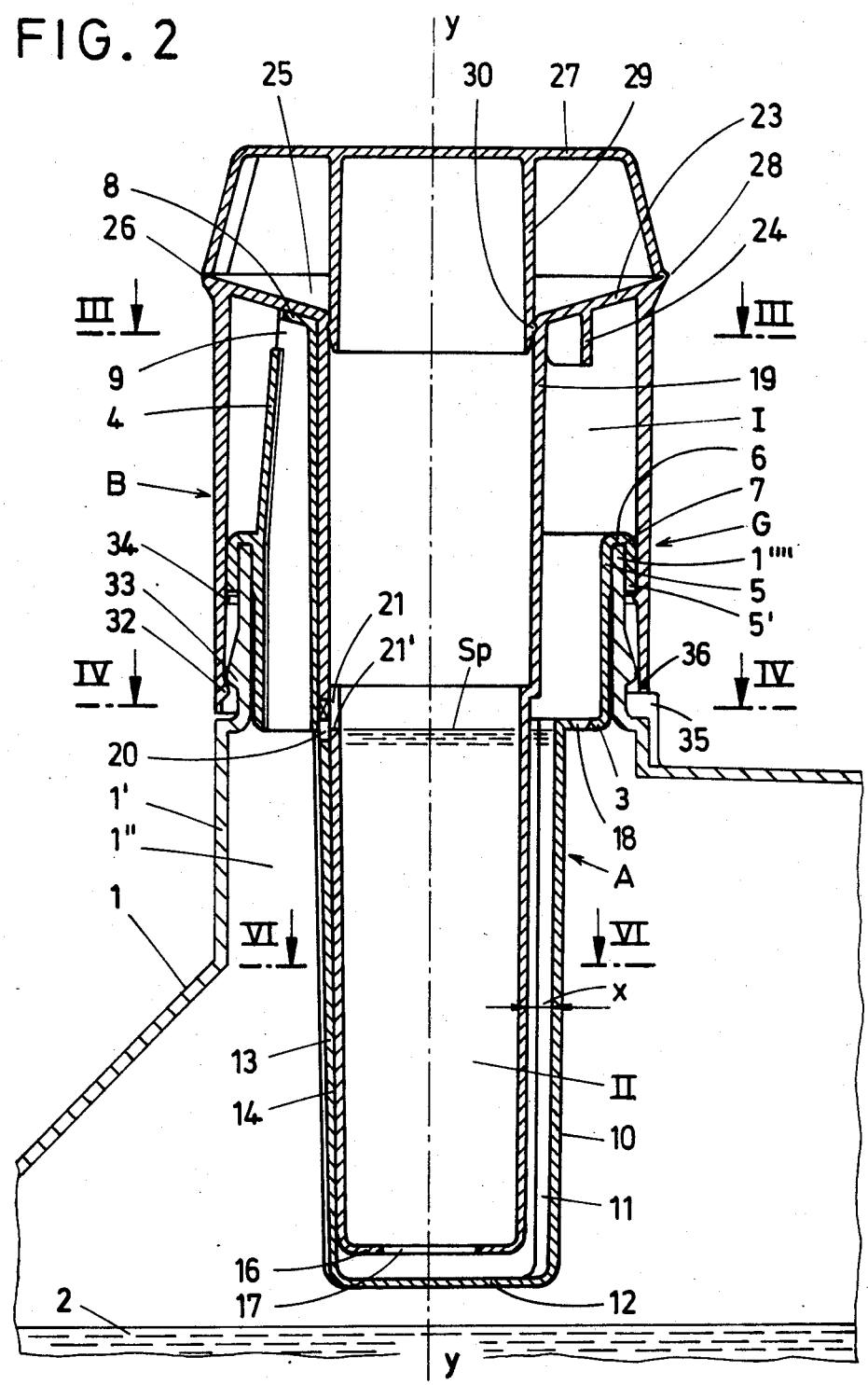
FIG. 2 is a vertical section through the device.
Figure 3:
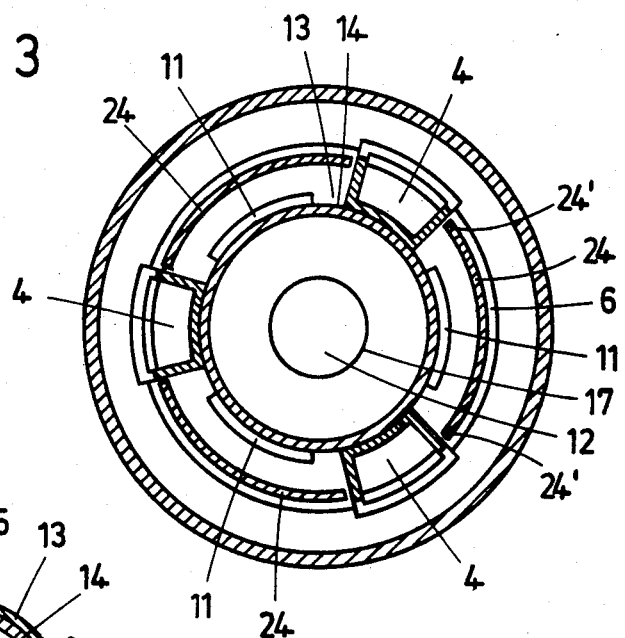
FIG. 3 is a section along the line III—III of FIG. 2.

The function of the device is as follows: The storage container, equipped with the device in accordance with the invention, is brought, after the opening of the hinged cover 27, into any desired position of tilt in such a manner that the device points downward. As a result, liquid 2 flows through all three feed tubes 4 into the upper chamber I which acts as flood chamber. The pressure equalization in the upper chamber takes place in this case via the air passage openings 18. A rapid filling is thus obtained. After this first tilting into lowered position the device is again placed in the upright position shown in FIG. 2. In this normal standing position the liquid 2 which has come into the upper chamber flows via the channels 11 formed by the beaker 10 into the pouring chamber II, passing through the flow opening 17. Excess liquid flows out of the upper chamber I via the three air passage openings. The final correction of dose is obtained by the overflow opening 21, which defines the level Sp.

The device is now again brought into the tilted position. The dosaged quantity of liquid which has passed into the pouring chamber II will thereby be dispensed through the central delivery tube 19 by tilting in any desired direction (with the exception of the region of the hinge).

The pressure equalization with the inside of the bottle is effected via the hole 20 and/or the overflow opening 21.

A possibility of correcting the amount of the dose is provided by drawing-in the bottom 12 with a consequent reduction in volume obtained thereby. Such drawing or pulling in, however, still facilitates cooperation with the flow hole, of course, with the required but diminished clearance.

We claim:

1. In a device adapted for the dosed dispensing of liquid from a storage container through a delivery tube which comes out of a lower pouring chamber upon a second upside down turning, a housing shaped as a cup having a transverse wall at a bottom of the cup and defining an upper chamber, the pouring chamber and the upper chamber communicating with each other through a flow hole, the transverse wall being traversed by a feed tube opening thereabove, said delivery tube projecting above the feed tube and an air passage-extends through the transverse wall, the improvement comprising at least three of said feed tubes arranged in symmetrical angular distribution with a respective said air passage opening arranged between them, said upper chamber is developed as a flood chamber and said pouring chamber further has an overflow opening, and a beaker extends below the upper chamber, said pouring chamber extends from said delivery tube and is arranged with flow clearance within said beaker, said beaker is formed with another hole at approximately the height of the transverse wall, said another hole is in communication with said overflow opening.

2. The device according to claim 1, wherein said beaker is formed with a plurality of channels which are spaced angularly from each other and which define said flow clearance between said pouring chamber and said beaker.

3. The device according to claim 2, wherein said beaker further comprises wall sections between said channels, said wall sections rest against the outer surface of said pouring chamber.

4. The device according to claim 1, wherein said beaker is formed with a plurality of channels which are spaced angularly from each other, respective ones of said channels and said air passage openings are arranged along a same respective radius.

5. The device according to claim 1, wherein a region of the mouth of the delivery tube forms an outwardly-directed collar forming a funnel, and a bottom part of said collar is in non-rotatable engagement with ends of said feed tubes.

6. In a device adapted for the dosed dispensing of liquid from a storage container through a delivery tube which comes out of a lower pouring chamber upon a second upside down turning, a housing shaped as a cup having a transverse wall at a bottom of the cup and defining an upper chamber, the pouring chamber and the upper chamber communicating with each other through a flow hole, the transverse wall being traversed by a feed tube opening thereabove, said delivery tube projecting above the feed tube and an air passage extends through the transverse wall, the improvement comprising at least three of said feed tubes arranged in symmetrical angular distribution with a respective said air passage opening arranged between them, said cup-shaped housing comprises a cup-forming annular wall of a first part of the housing, said housing being formed as an insert, a rim edge of the cup being bent over to form an insertion groove and disposed for sealing over a stepped-down end region of a neck of the container, and wherein said feed tubes extend from said transverse wall and are directed upward in the direction of dispensing and are formed in said cup-forming annular wall, and said feed tubes extend above said rim edge by an amount substantially equal to the depth of said cup.

7. The device according to claim 6, wherein said transverse wall forms a bottom of said cup and extends into a substantially cylindrical beaker of reduced cross section relative to said cup, the height of said beaker corresponding approximately to $2\frac{1}{2}$ times the depth of said cup.

8. The device according to claim 7, wherein said beaker is formed in one-piece with said first part of said housing and surrounds said pouring chamber defining a clearance enabling passage of the liquid between an outer wall of said pouring chamber and an inner wall of said beaker.

9. The device according to claim 8, wherein said beaker comprises three angularly spaced channels which extend in a longitudinal direction of the beaker and come together in the region of the bottom of the beaker, said channels are formed by a circumferential meander-like bending of the beaker wall, said beaker wall further comprises wall sections between said channels, said wall sections rest against the outer surface of said pouring chamber, said clearance being defined by said channels.

10. The device according to claim 7, wherein said beaker is slightly conical.

* * * * *